(12) United States Patent
Hightower et al.

(10) Patent No.: US 8,880,347 B1
(45) Date of Patent: Nov. 4, 2014

(54) ADJUSTING TURN INDICATORS IN VIEW OF ROAD GEOMETRY

(71) Applicants: Jeffrey Hightower, Bothell, WA (US); William H. Steinmetz, Seattle, WA (US)

(72) Inventors: Jeffrey Hightower, Bothell, WA (US); William H. Steinmetz, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/949,915

(22) Filed: Jul. 24, 2013

(51) Int. Cl.
*G01C 21/34* (2006.01)
*G01C 21/36* (2006.01)

(52) U.S. Cl.
CPC .................... *G01C 21/3632* (2013.01)
USPC .......................................... 701/533

(58) Field of Classification Search
USPC .......................... 701/400, 409–410
See application file for complete search history.

(56) References Cited

U.S. PATENT DOCUMENTS

| | | | |
|---|---|---|---|
| 6,732,046 B1* | 5/2004 | Joshi | 701/461 |
| 7,760,914 B2* | 7/2010 | Santamaria et al. | 382/113 |
| 8,204,680 B1* | 6/2012 | Dorum | 701/411 |
| 8,392,457 B1* | 3/2013 | Bender et al. | 707/791 |
| 2003/0223615 A1* | 12/2003 | Keaton et al. | 382/100 |
| 2005/0107993 A1* | 5/2005 | Cuthbert et al. | 703/2 |
| 2010/0256899 A1* | 10/2010 | Katzer | 701/201 |
| 2012/0245817 A1* | 9/2012 | Cooprider et al. | 701/70 |

\* cited by examiner

*Primary Examiner* — Yonel Beaulieu
(74) *Attorney, Agent, or Firm* — Marshall, Gerstein & Borun LLP (57) ABSTRACT

The present disclosure relates to generating graphical turn indicators associated with road junctions having an on-route road segment and multiple off-route road segments extending from a center of the road junction. More particularly, the present disclosure provides graphical turn indicators that represent road junctions having multiple road segments that extend from a center of the road junction within close angular proximity with respect to one another. Each road segment of a road junction is mapped to a unique graphical element of the graphical turn indicator and each graphical element represents a particular turn type.

20 Claims, 9 Drawing Sheets

ADJUSTING TURN INDICATORS IN VIEW OF ROAD GEOMETRY

FIELD OF THE INVENTION

The present disclosure relates to generating graphical turn indicators that illustrate road junctions. More specifically, the present disclosure relates to generating graphical turn indicators that illustrate maneuvers associated with road junctions that have multiple road segments extending from a center of the road junction in close angular proximity to one another.

BACKGROUND

Similar to physical road signs, digital graphical turn indicators illustrate available maneuvers at intersections and other road junctions. A typical graphical turn indicator includes arrows indicating the available directions of travel at the road junction. Software applications can display such indicators to illustrate turns, lane mergers, lane divisions, etc. For example, a software application can present a sequence of graphical turn indicators as part of a display of turn-by-turn directions. Such software applications can execute on dedicated electronic devices (such as car navigation systems built into head units of cars or external navigators) or general-purpose electronic devices (such as desktop computers, laptop computers, tablet computers, smart phones, etc.).

Although it is sometimes desirable to generate a graphical turn indicator that corresponds to the geometry of the road junction, such graphical turn indicators do not always present the clearest schematic view of the road junction. For example, if two road segments form a 20-degree angle, a graphical turn indicator that illustrates the two roads at the same 20-degree angle typically is not as clear a graphical turn indicator in which the angle is wider (e.g., 45 degrees) and, accordingly, the contrast between the two road segment is sharper.

SUMMARY

According to one implementation, a method in a computing device is provided for generating a graphical turn indicator to illustrate a maneuver at a road junction that interconnects several road segments. The method includes determining, based on the geometry of the road junction, in which circular sector corresponding to different turn types each of the road segments lies. This defines the initial mapping between the road segments and the circular sectors. In response to determining that a certain road segment and another road segment are mapped to a same shared circular sector, the method includes associating the one of the road segments with a circular sector adjacent to the shared circular sector to generate an adjusted mapping between the road segments and the circular sectors. Further, the method includes generating the graphical turn indicator according to the adjusted mapping, including generating different graphical elements, such as arrows, for different turn types indicated by the graphical turn indicator.

In another implementation, a computer-readable medium stores instructions for generating graphical turn indicators is provided to illustrate maneuvers at road junctions. The instructions, when executed on one or more processors, cause the one or more processors to receive turn-by-turn driving directions that specify a route between an origin and a destination, where the route includes several road junctions. Each road junction interconnects several road segments. The instructions further cause the one or more processors to generate graphical turn indicators for the road junctions, including render a respective arrow for each turn type the maneuver includes at a road junction, in accordance with the geometry of the road junction. Each turn type may be selected from a finite, circularly ordered set of turn types. When the maneuver includes two outgoing turns that correspond to a same shared turn type, render, for one of the two outgoing turns, an arrow for a turn type adjacent to the shared turn type in the circularly ordered set.

In yet another implementation, a method in a computing device is provided for schematically indicating turn types available for a maneuver at a road junction interconnecting several road segments. The method includes determining a mapping between an outbound road segment and one of a finite, circularly ordered set of turn types, in accordance with the geometry of the road junction, for each outbound road segment at the road junction. The method further includes, in response to determining that two outbound road segments at the road junction map to a same turn type, re-mapping a selected one of the two outbound road segments to a different turn type. The method also includes causing different schematic indicators to be generated for those in the set of turn types to which outbound road segments are mapped.

In still another implementation, a means is provided for schematically indicating turn types available for a maneuver at a road junction interconnecting several road segments. For each outbound road segment at the road junction, the means determines a mapping between the outbound road segment and one of a finite, circularly ordered set of turn types, in accordance with the geometry of the road junction. The means, in response to determining that two outbound road segments at the road junction map to a same turn type, re-maps a selected one of the two outbound road segments to a different turn type. The means also causes different schematic indicators to be generated for those in the set of turn types to which outbound road segments are mapped.

In still another implementation, a means is provided for schematically indicating turn types available for a maneuver at a road junction interconnecting several road segments. For each outbound road segment at the road junction, the means determines a mapping between the outbound road segment and one of a finite, circularly ordered set of turn types, in accordance with the geometry of the road junction. The means, in response to determining that two outbound road segments at the road junction map to a same turn type, re-maps a selected one of the two outbound road segments to a different turn type. The means also causes different schematic indicators to be generated for those in the set of turn types to which outbound road segments are mapped.

The features and advantages described in this summary and the following detailed description are not all-inclusive. Many additional features and advantages will be apparent to one of ordinary skill in the art in view of the drawings, specification, and claims hereof.

DETAILED DESCRIPTION

The systems and methods of the present disclosure can generate intuitive and unambiguous graphical turn indicators that schematically illustrate road junctions at which several road segments extend from a center in close angular proximity to each another while eliminating any ambiguity. These graphical turn indicators include arrows or any other suitable graphical elements that have sufficient angular separation to clearly illustrate each road segment.

More particularly, a graphical turn indicator generation module (or "turn icon generator") maps road segments of a road junction onto circular sectors, each corresponding to a turn type (sharp left, left, slight left, straight, etc.). When two road segments are within the same circular sector, the turn icon generator re-maps, or "bumps," one of the two road segments to an adjacent circular sector.

According to some implementations, the turn icon generator determines which road segments should be bumped in view of a directed route that passes through the road junction. For example, the turn icon generator can generate a graphical turn indicator as part of navigation instructions guiding a user along a route from origin to destination. Accordingly, some road segments at road junctions lead the user off-route, while other road segments are viable options for staying on route. When two road segments correspond to a common turn type and each of the road segments is an off-route road segment, the turn icon generator bumps the road segment that is closest to the adjacent circular sector. When two road segments correspond to a common turn type and one of the two road segments is an on-route road segment, the turn icon generator bumps the off-route road segment to an adjacent circular sector.

Figure 1:
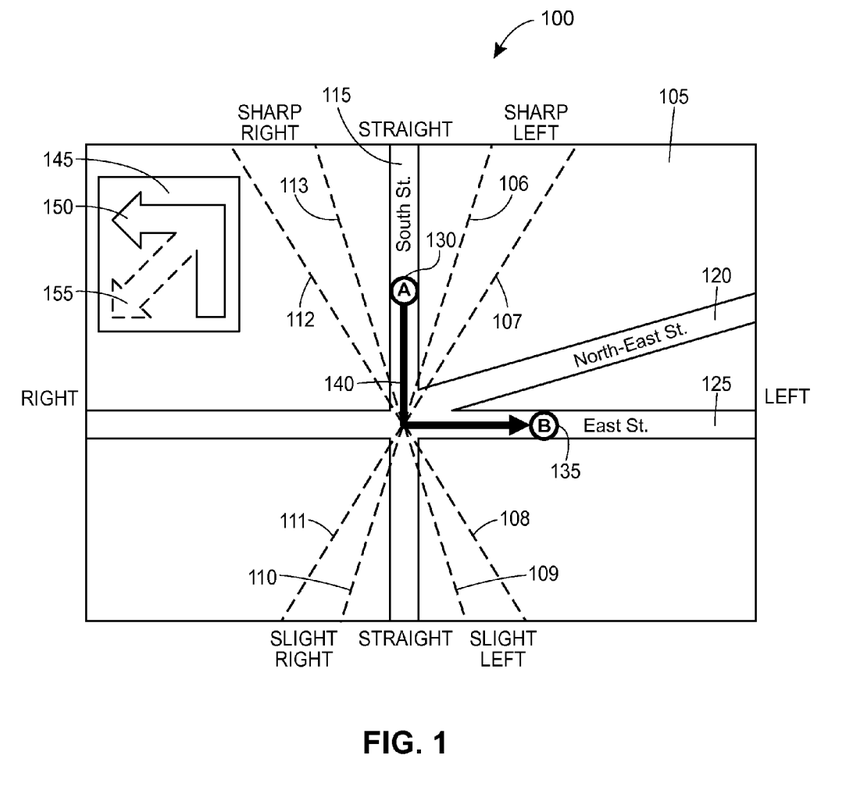
FIG. 1 depicts an example graphical turn indicator overlaying a digital map displaying the intersection to which the graphical turn indicator corresponds, generated using the techniques of the present disclosure, for a certain direction of travel.

Turning to FIG. 1, a turn icon generator implemented in a client device or a network server renders an example graphical turn indicator (for simplicity, "indicator") 145 illustrating available maneuvers at a five-way intersection 105. The indicator 145 in this case schematically illustrates an on-route left turn and off-route sharp left turn for traveling through the intersection 105 along a route 140 from an origin 130 to a destination 135. For clarity, the graphical turn indicator 145 in FIG. 1 overlays a digital map 100 that illustrates the real-world geometry intersection 105.

A graphical turn indicator in general can include arrows, or any other suitable graphical elements, that represent such turn types as sharp-left, left, slight-left, straight, slight-right, right, sharp-right, and u-turn. The sharp-left turn and the slight-left turn may be considered to be sub-types of the left turn. The sharp-right turn and the slight-right turn may be considered to be sub-types of the right turn. The turn types define a circularly ordered set of turn types.

As further illustrated in FIG. 1, each of the turn types corresponds to a certain circular sector (or "bucket"). Eight sectors, demarcated by the dashed lines 106-113, are shown in FIG. 1: Sharp Right, Right, Slight Right, Straight, Slight Left, Left, Sharp Left, and U-turn. Each of these circular sectors corresponds to a respective turn type within the ordered set of turn types. Sharp Right, Right, Slight Right, Straight, Slight Left, Left, Sharp Left, and U-turn. The center of the eight sectors coincides with a center of the road junction 105. The circular sectors need not be of the same size. In this example, the Right and Left sectors are significantly larger than the other sectors.

As can be seen in FIG. 1, South St. 115 extends from the u-turn sector through the center of the road junction 105 into the Straight sector. East St. 125 extends from the Right sector through the center of the road junction 105 into the Left sector. North-East St. 120 extends from the center of the road junction 105 into the Left sector.

Even though both North-East St. 120 and a portion of East St. 125 extend into the Left sector, the turn icon generator generates the indicator 145 with two separate arrows, 150 and 155, to illustrate these road segments. Further, even though the segments 120 and 125 form a sharp angle, the turn icon generates spaces apart the arrows 150 and 155 to make the indicator 145 easy to understand. The turn icon generator in this example effectively "bumps" the arrow 155 from the Left sector to the Sharp Left sector, as discussed in more detail below.

In this example implementation, on-route and off-route turns are illustrated using arrows with dashed lines and solid lines, respectively. In another implementation, on-route turns and off-route turns can be depicted using different graphical elements different colors. Any suitable technique generally can be used to differentiate between on-route and off-route arrows.

Figure 2:
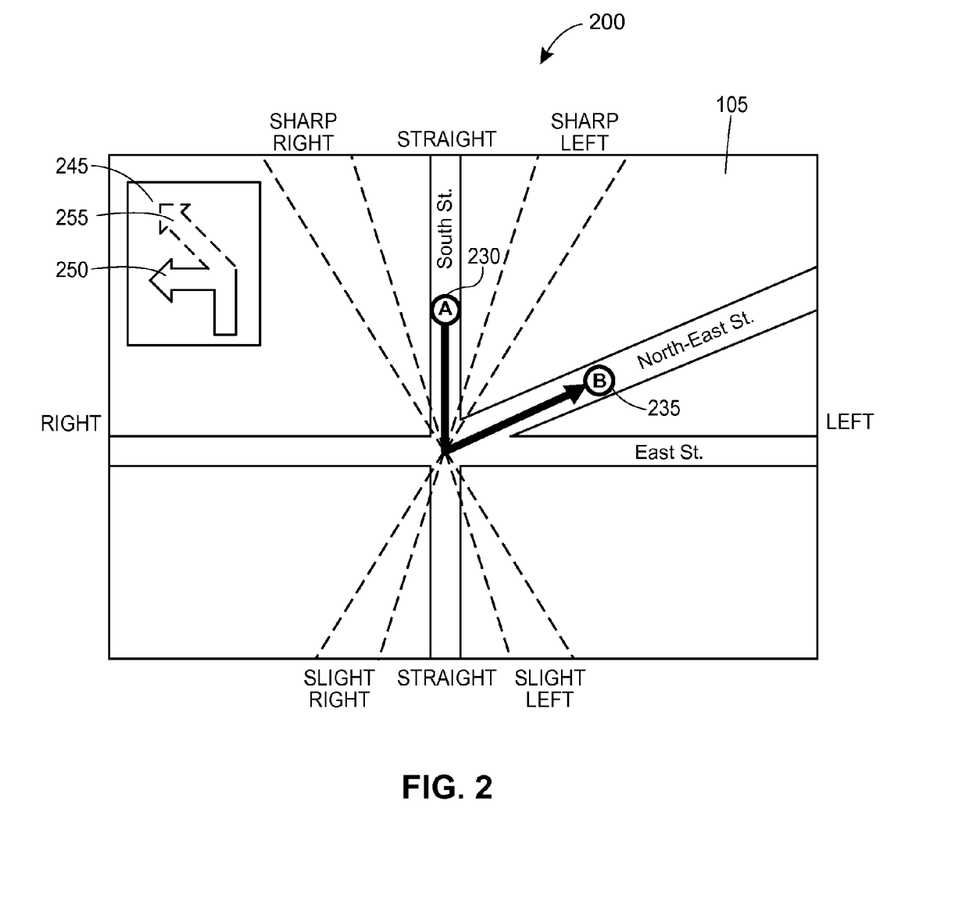
FIG. 2 depicts another example graphical turn indicator overlaying the digital map of FIG. 1, for another direction of travel.

With reference now to FIG. 2, a graphical turn indicator 245 corresponds to a different maneuver at the same intersection 105. In particular, the graphical turn indicator 245 schematically illustrates an an-route turn onto North-East St. as a left turn (arrow 250), and an off-route turn onto East St. (arrow 245) as a slight left turn. The user in this example is traveling from an origin 230 to a destination 235 through the intersection 105. In contrast to the scenario of FIG. 1, the turn indicator bumps the arrow 255 from the Left sector to the Slight Left.

Figure 3:
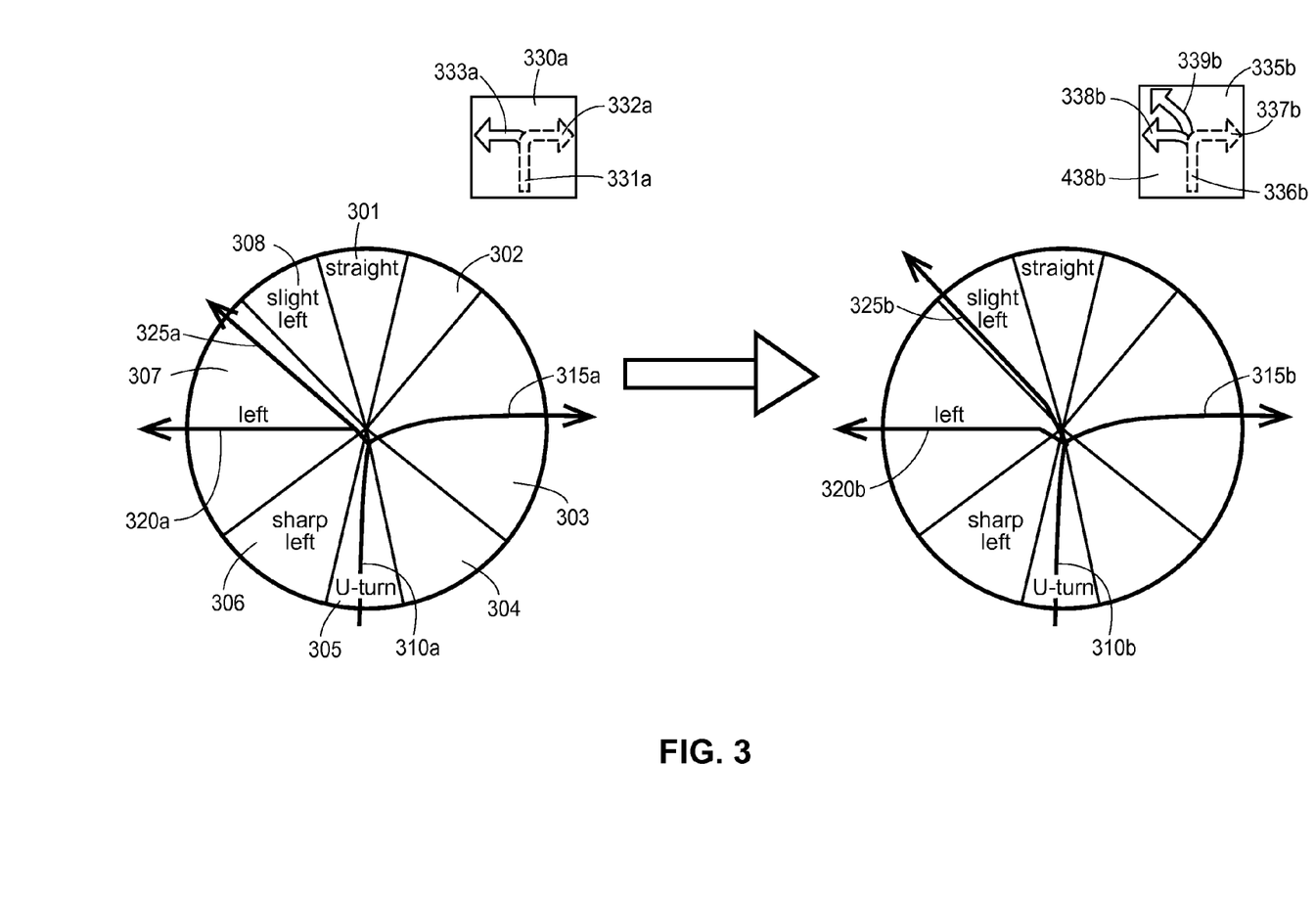
FIGS. 3-6 schematically illustrate examples of adjustment of the mapping between five-way intersections and circular
Figure 4:
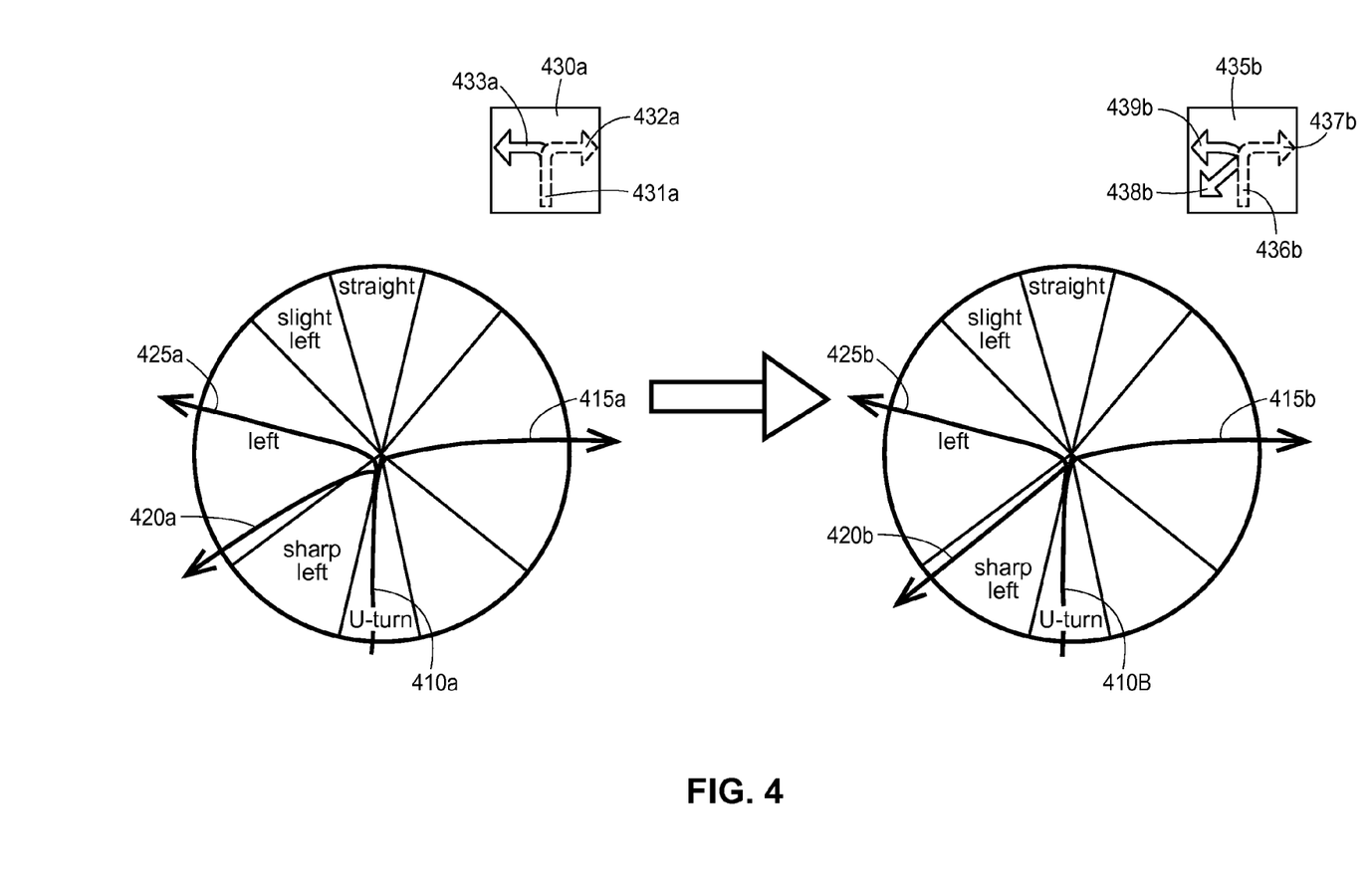
Figure 5:
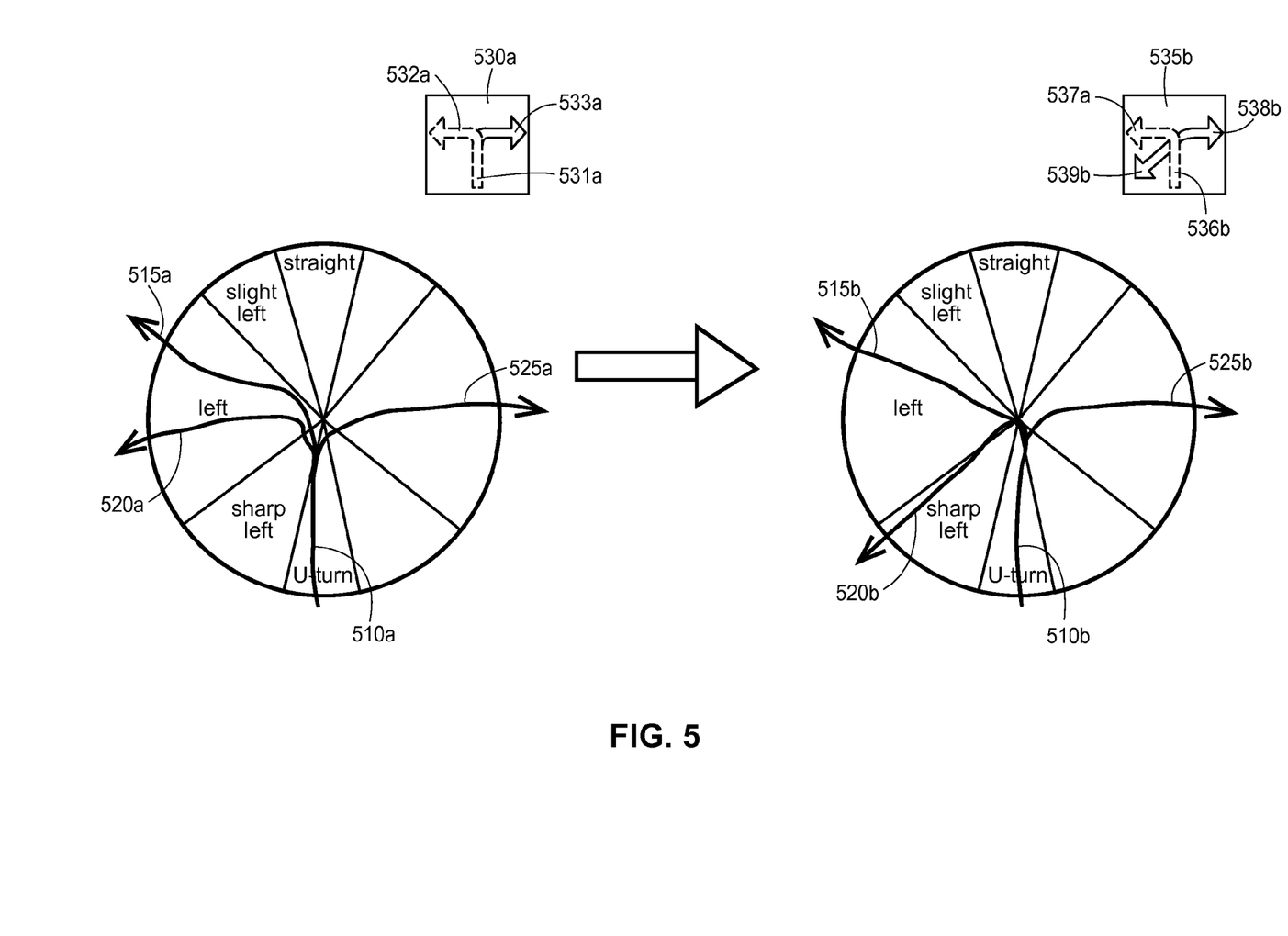

Referring to FIGS. 3-5, graphical turn indicators 335b, 435b, 535b can be compared to graphical turn indicators 330a, 430a, 530a using the corresponding illustrations. Elements in FIG. 3 labeled with "a" and "b" following a common number represent similar elements. The left side of FIG. 3 illustrates real-world geometry of an example intersection superimposed on an imaginary circle made up of eight sectors. Arrows indicate the direction of travel for a certain route that passes through the intersection. The intersection includes an-route road segment 310a within the U-turn sector (305), an an-route road segment 315a within the Right Turn sector (303), and off-route road segments 320a and 325a within the Left Turn sector (307). There are no road segments within the other sectors in this example configuration. Because both road segments 320a and 325a are within the same Left Turn sector, the arrow 333a of the graphical turn indicator 330a illustrates the same left turn for both the third road segment 320a and the fourth road segment 325a.

A turn icon generator that implements the techniques of the present disclosure generates the graphical turn indicator 335b in lieu of the graphical turn indicator 330a. In particular, the turn icon generator in this example bumps the road segment 325b to the closest adjacent sector, the Slight Left sector, while keeping the third road segment 320b in the Left sector.

In a sense, the turn icon generator draws the graphical turn indicator 335b in accordance with an alternative geometry of the intersection. As a result of re-mapping the road segment 325b to the Slight Left Sector, the arrow 338b is now uniquely associated with the road segment 320b while the arrow 339b is uniquely associated with the road segment 325b. Because the road segment 310b is the only road segment within the U-turn sector, the arrow 336b of the graphic turn indicator 335b is uniquely associated with the road segment 310b. Similarly, because the road segment 315b is the only road segment within the Right sector, the arrow 337b of the graphic turn indicator 335b is uniquely associated with the road segment 310b.

As reflected in FIG. 3, and as described in detail herein, because the road segment 325a is off-route and closer to the adjacent Slight Left sector as compared to the road segment 320a (relative to both the Sharp Left sector and the Slight Left sector), the road segment 325a is transformed to the road segment 325b and, as a result, mapped to the Slight Left sector.

As illustrated on the left in FIG. 4, another example road junction includes a road segment 410a within the U-turn sector, a road segment 415a within the Right Turn sector, a road segment 420a within the Left Turn sector, and a road segment 425a within the Left Turn sector, according to the real-world geometry of the intersection. The road segments 410a and 415a are on-route, and the road segments 420a and 425a are off-route.

Because the road segment 420a and the road segment 425a are within the same Left Turn sector, the arrow 433a of the graphical turn indicator 430a illustrates a left turn for both the road segment 420a and the road segment 425a. On the other hand, because the road segment 410a is the only road segment within the U-turn sector, the arrow 431a is uniquely associated with the road segment 410a. The arrow 432a similarly is uniquely associated with the road segment 415a.

In this scenario, a turn icon generator of the present disclosure generates a graphical turn indicator 435b in lieu of the graphical turn indicator 430a. In particular, the turn icon generator maps the road segment 420b to the Sharp Left sector (which is closer than the Slight Left sector), while the road segment 425b remains in the Left sector. As a result of mapping the road segment 420b to the Sharp Left sector, the arrow 438b is now uniquely associated with the road segment 420b, while the arrow 439b is uniquely associated with the road segment 425b. The arrows 436b and 437b are uniquely associated with the road segments 410b and 415b, respectively.

As illustrated in FIG. 5 on the left, another example intersection includes road segments 510a, 515a, 520a, and 525a. The road segments 510a and 525a are within the U-turn sector and the Right Turn sector, respectively. Both the road segments 515a and 520a are within the Left Turn sector, according to the real-world geometry of the intersection. A graphical turn indicator 530a accordingly includes an arrow 532a representing both of these road segments. Arrows 531a and 533a correspond to the road segments 510a and 525a, respectively. In this example, the road segment 515a is on-route, while the road segment 520a is off-route. Although the road segment 515a is closer to the Slight Left sector than the road segment 520a is to the Slight Left or the Sharp Left sectors, the turn icon indicator bumps the road segment 520a to an adjacent sector. The turn icon indicator makes this selection because the road segment 520a is off-route and the road segment 515a is on-route.

Accordingly, as illustrated in FIG. 5 on the right, the turn icon generator can generate the graphical turn indicator 535b with arrows 536b corresponding to the road segment 510b, 538b corresponding to the road segment 525b, 539b corresponding to the road segment 520b, and 537a corresponding to the road segment 515b. Alternatively, the turn icon generator may consider lane type or road segment type in deciding which outgoing segment to bump into an adjacent sector. For example, if two outgoing segments appear straight, but one is from an exit lane, or is onto a ramp, the turn icon generator may bump the segment associated with the exit lane or ramp, considering the lane that continues along the highway as more conceptually straight.

Figure 6:
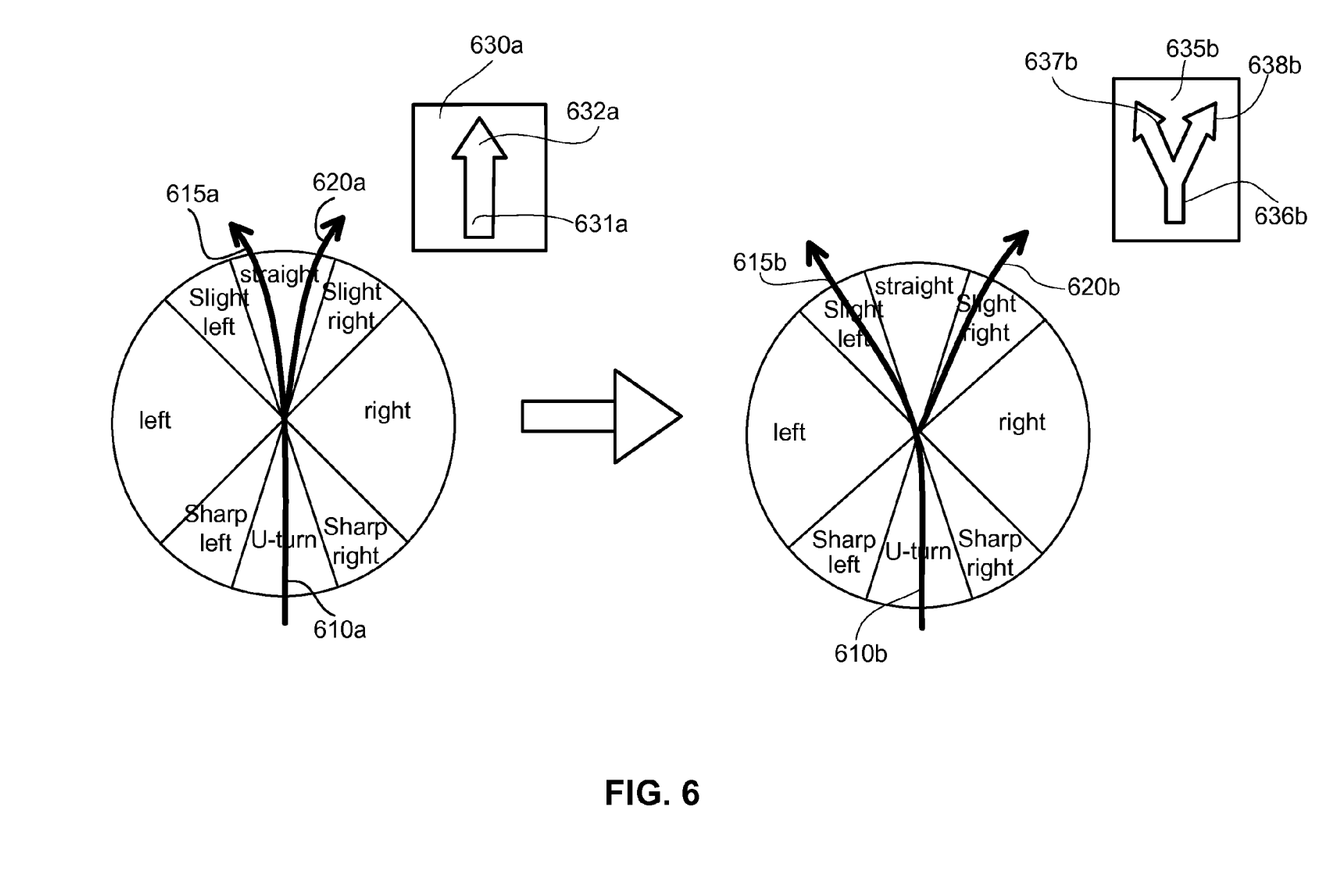

As illustrated in FIG. 6 on the left, another example intersection includes road segments 610a, 615a, and 620a. The road segment 610a is within the U-turn sector. Both the road segments 615a and 620a are within the Straight sector, according to the real-world geometry of the intersection. A graphical turn indicator 630a accordingly includes an arrow 632a representing both of these road segments. Arrow 631a corresponds to the road segment 610a. In this example, either road segment 615a or 620a may be on-route. Although either road segment 615a or 620a may be on-route, the turn icon indicator bumps the road segment 615a to the Slight left sector and bumps the road segment 620a to the Slight right sector. The turn icon indicator makes this selection because the road segments 615a, 620a may be associated with respective forking lanes on a highway and may diverge slowly.

Accordingly, as illustrated in FIG. 6 on the right, the turn icon generator can generate the graphical turn indicator 635b with arrows 636b corresponding to the road segment 610b, 637b corresponding to the road segment 615b, and 638b corresponding to the road segment 620b. A turn icon indicator similar to the turn icon indicator 635b may be used to further decorate turn icon indicators 335b, 435b, 535b based on lane type (e.g., HOV lane, exit lane, turn lane, shared lane, etc.) or road segment types (e.g., ramp, highway, artery, side road, etc.). For example, the turn icon generator may generate a graphical turn indicator that represents a slight left thru lane diverging from a turn lane by displaying a road segment to diverge from the thru lane at an early point, continue parallel to the turn lane, then turn slightly to the left.

An example implementation of a turn icon generator, or graphical turn indicator generation module, that can generate turn indicators discussed above is now described with reference to FIG. 7.

Figure 7:
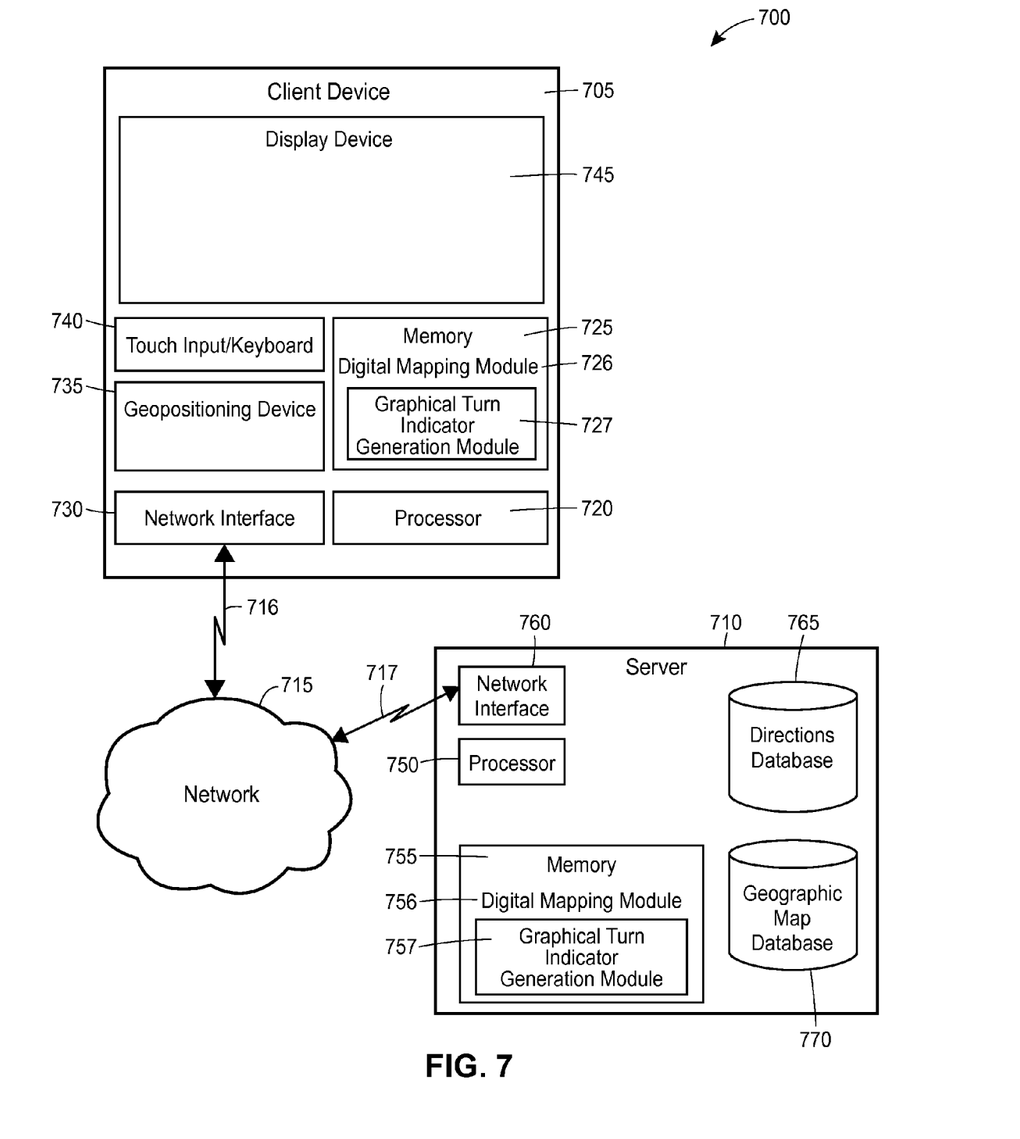
FIG. 7 depicts a block diagram of an example computer system in which graphical turn indicators are generated using the techniques of the present disclosure.

A computer system 700 implements communications between a client device 705 and a remote computing device (e.g., a server) 710 to provide information to a user of the client device 705. The client device 705 is communicatively coupled to the remote computing device 710 via a network 715.

For clarity, only one client device 705 is depicted in FIG. 7. However, it should be understood that any number of client devices 705 may be supported and that each client device 705 may be any appropriate computing device, such as a desktop computer, a mobile telephone, a personal data assistant, a laptop computer, a tablet computer, a navigation system built into a vehicle, etc. The client device 705 may include a memory 725 and a processor 720 for storing and executing, respectively, software instructions that make up a digital mapping module 726 and a graphical turn indicator generation module 727. The module 727, stored in the memory 725 as a set of computer-readable instructions can generate graphical turn indicators 335b, 435b, and 535b discussed above.

The processor 720, further executing the module 726, can facilitate communications between the computing device 710 and the client device 705 via a network interface 730, a wired or wireless communication link 716, and the network 715.

The client device 705 may also include a geopositioning device 735, such as a Global Positioning System receiver or a Wireless Local Area Network (WLAN) positioning device for determining a geographic location of the client device 705. The client device 705 may include a display device 745 which may be any type of electronic display device such as a liquid crystal display (LCD), a light emitting diode (LED) display, a plasma display, a cathode ray tube (CRT) display, or any other type of known or suitable electronic display. The display device 745 can display graphical turn indicators similar to the indicators 335b, 435b, and 535b discussed above.

Further, the client device 705 may include a user input device 740, such as a touch input/keyboard that provides a mechanism for a user of the client device 710 to launch a host application, to enter related information, etc. The user input device 740 may be configured as an integral part of a display device 745, such as a touch screen display device. The network interface 730 may be configured to facilitate communications between the client device 705 and the remote computing device 710 via any hardwired or wireless communication network 715. Moreover, the client device 705 may be communicatively connected to the remote computing device 710 via any suitable communication system, such as via any publicly available or privately owned communication network, including those that use wireless communication structures, such as wireless communication networks, including for example, WLANs, satellite and cellular phone communication systems, etc.

The computing device 710 may include a memory 755 and a processor 750 for storing and executing, respectively, a digital mapping module 756 and a graphical turn indicator generation module 757. The module 757, stored in the memory 750 as a set of computer-readable instructions, facilitates applications related to generating graphical turn indicators, such as graphical turn indicator 335b, 435b, 535b of FIGS. 3-5, respectively. The module 756 may facilitate communications between the computing device 710 and the client device 705 via a network interface 760, a remote computing device network connection 717 and the network 715 and other functions and instructions.

The computing device 710 may also include a directions database 765, having data representative of various graphical turn indicators, and a geographic map database 770, having data representative of a geographic map and associated map features. The directions database 765 may include data representative of schematically illustrated graphical turn indicators. The terms "schematically illustrated," "schematically indicating" and "schematic indicator" should be understood to mean a schematic diagram that represents the graphic elements of a graphical turn indicator using abstract, graphic symbols (e.g., arrows, curves, lines, etc.) rather than realistic pictures of the roadways. While the directions database 765 and the geographic map database 770 are shown in FIG. 7 as being contained within the remote computing device 710, it should be understood that the directions database 765 and/or the geographic map database 770 may be located within separate remote servers (or any other suitable computing devices) communicatively coupled to the network 715 and, or the client device 705. Optionally, portions of the directions database 765 and/or the geographic map database 770 may be associated with memories that are separate from one another, such as a memory 725 of the client device 705.

Figure 8:
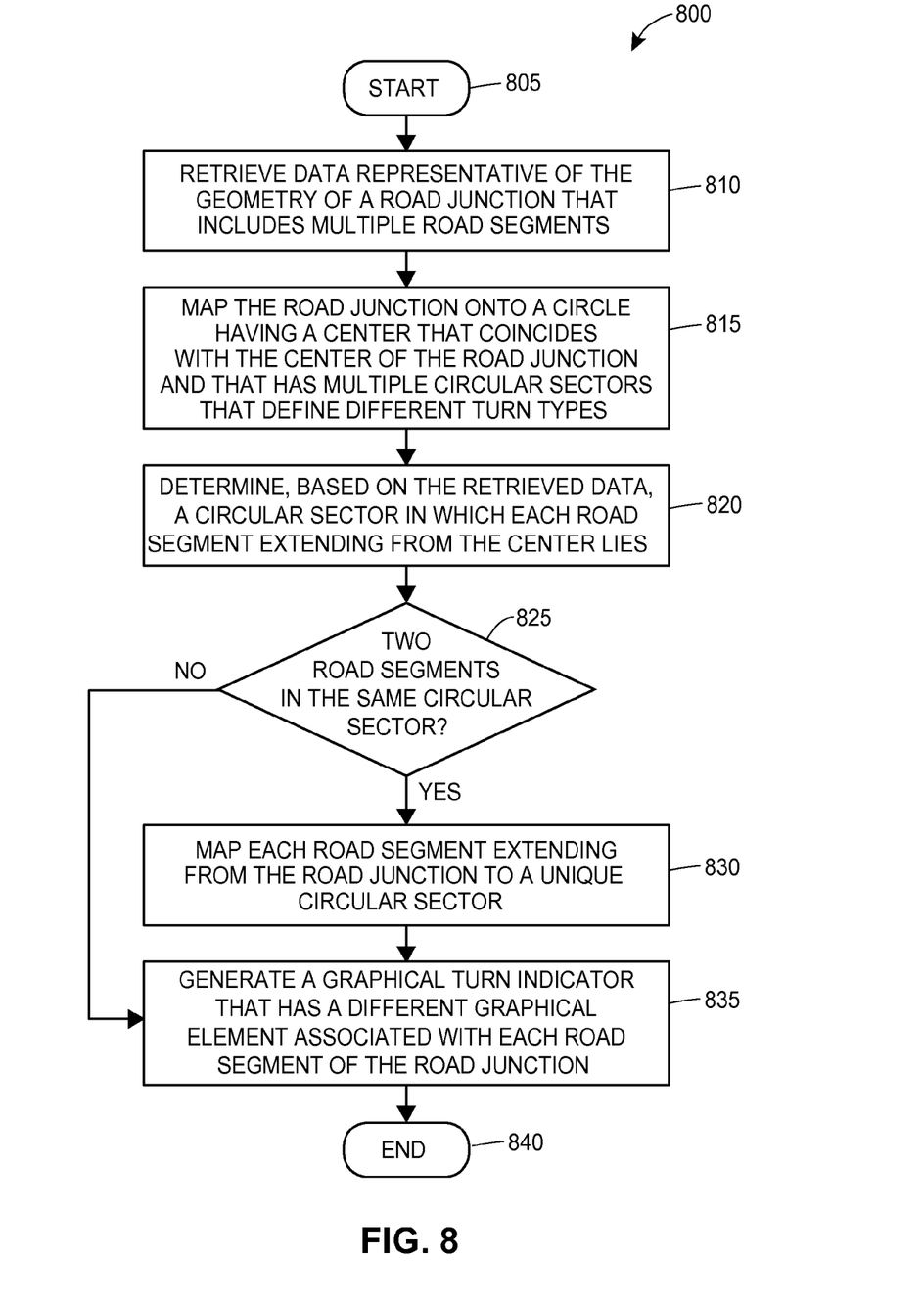
FIG. 8 depicts a flow diagram for an example method of generating graphical turn indicators, which can be implemented in the computer system of FIG. 7.

FIG. 8 depicts a flow diagram of an example method 800 for generating graphical turn indicators (e.g., graphical turn indicator 145 of FIG. 1, 245 of FIGS. 2 and 335b, 435b, 535b of FIGS. 3-5, respectively). While the method 800 may be implemented by executing the modules 726, 727, 756, 757 of FIG. 7, or a portion thereof, using a processor, similar to processor 720 and/or 750 of FIG. 7, implementation of the method 800 is described below in conjunction with processor 750.

The processor 750 may initiate the method 800 of generating a graphical turn indicator 145 (block 805). The processor 750 may retrieve data representative of geometry related to a particular road junction 105, that includes multiple road segments extending from a center of the road junction in close angular proximity with respect to one another, from a geographic map database 770 (block 810). The processor 750 may map the road junction 105 onto a circle having a center that coincides with the center of the road junction 105 and that has multiple circular sectors 301b-308b that define different turn types (e.g., a sharp-left turn, a left turn, a slight-left turn, a straight direction, a slight-right turn, a right turn, a sharp-right turn and/or a u-turn) (block 815). The processor 750 may determine, based on the retrieved geographic map data, a circular sector 301b-308b in which each road segment 115, 120, 125, extending from a center of the road junction 105, lies (block 820).

Next, the processor 750 may determine whether any two road segments 115, 120, 125 lie in the same circular sector 301a-308a (block 825). If the processor 750 determines that there are not two road segments 120, 125 that lie within the same circular sector 301a-308a (block 825), the processor 750 may generate a graphical turn indicator 145 that has a different graphical element 150, 155 associated with each road segment 120, 125 of the road junction 105 (block 835). When generating the graphical turn indicator 145 (block 835), the processor 750 may retrieve schematic indicator graphics (e.g., straight lines, curved lines, arrows, etc.) from a directions database (e.g., directions database 765). If the processor 750 determines that there are two road segments 120, 125 that lie within the same circular sector 301a-308a (block 825), the processor 750 may map each road segment 120, 125 to a unique circular sector 301b-308b (block 830). Once the processor 750 maps each road segment 120, 125 to a unique circular sector 301b-308b (block 830), the processor 750 may generate a graphical turn indicator 145 that has a different graphical element 150, 155 associated with each road segment 120, 125 of the road junction 105 (block 835) and then end the method 800 (block 840).

Figure 9:
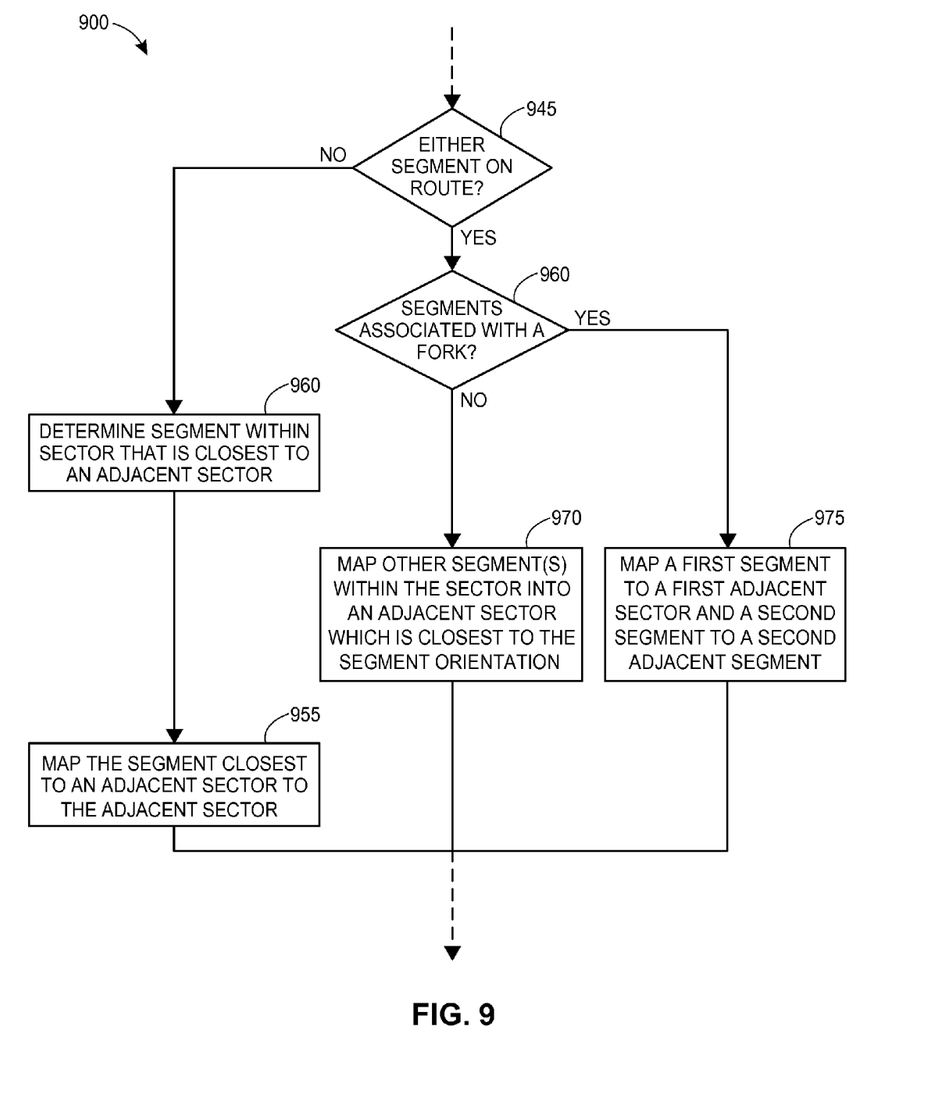
FIG. 9 depicts a flow diagram of an example method for generating a graphical turn indicator for a road junction in view of a route including the road junction, which also can be implemented in the computer system of FIG. 7.

Now referring to FIG. 9, a method 900 can be invoked at block 830 of the method of FIG. 8, for example. While the method 900 may be implemented by executing the modules 726, 727, 756, 757 of FIG. 7, or a portion thereof, using a processor, similar to processor 720 and/or 750 of FIG. 7, implementation of the method 900 is described below in conjunction with processor 750. As depicted in FIG. 9, the processor 750 may determine whether either of any two road segments 120, 125, that are within the same sector 301a-308a, are an on-route road segment 125 (block 945). In response to determining that the road segment 125 is on route (block 945), the processor 750 may determine whether the road segments 615a, 620a are associated with a fork (e.g., a turn lane or off-ramp) (block 960). In response to determining that the road segments 120, 125 are not associated with a fork, the processor 750 maps the road segment 120 (e.g., an off-route road segment) to an adjacent sector (e.g., the sharp-left sector) that is closest to the road segment 120 (block 970). In response to determining that the road segments 615a, 620a are associated with a fork (block 960), the processor 750 maps the road segment 615a to a first adjacent sector (e.g., a slight-left sector) and maps the road segment 620a to a second adjacent sector (e.g., a slight-right sector) (block 975). In response to determining that neither road segment 320a, 325a is on-route (block 945), the processor 750 determines which road segment 320a, 325a is closest to an adjacent sector 308a (block 950). In response to determining that the road segment 325a is closer to sector 308a when compared to how close the road segment 320a is with respect to sector 306a (block 950), the processor 750 maps the road segment 325b to the sector 308b (block 955).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, or mechanisms. Modules may constitute either software modules or hardware modules. A hardware module is tangible unit capable of performing certain operations and may be configured or arranged in a certain manner. In example embodiments, one or more computer systems (e.g., a standalone, display or server computer system) or one or more hardware modules of a computer system (e.g., a processor or a group of processors) may be configured by software (e.g., an application or application portion) as a hardware module that operates to perform certain operations as described herein.

In various embodiments, a module may be implemented using software, firmware, or hardware. For example, a module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods, modules and routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of systems and methods for generating graphical turn indicators for purposes of illustration only. One skilled in the art will readily recognize from the above discussion that alternative embodiments of the systems and methods illustrated herein may be employed without departing from the principles described herein.

Upon reading this disclosure, those of skill in the art will appreciate still additional alternative structural and functional designs for systems and methods for generating graphical turn indicators. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device for generating a graphical turn indicator to illustrate a maneuver at a road junction that interconnects a plurality of road segments including a first road segment and a second road segment, the method comprising:
   determining, based on the geometry of the road junction, in which circular sector each of the plurality of road segments lies to generate a mapping between the plurality of road segments and a multiplicity of circular sectors, wherein each of the multiplicity of circular sectors corresponds to a different turn type;
   in response to determining that the first road segment and the second road segment are mapped to a shared circular sector, associating the first road segment with a circular sector adjacent to the shared circular sector to generate an adjusted mapping between the plurality of road segments and the multiplicity of circular sectors; and
   generating the graphical turn indicator according to the adjusted mapping, including generating different graphical elements for different turn types indicated by the graphical turn indicator.

2. The method of claim 1, wherein the turn type is selected from a set that consists of sharp left, left, slight left, straight, slight right, right, sharp right, and u-turn.

3. The method of claim 1, wherein generating different graphical elements includes generating different arrows pointing in the available directions of travel through the road junction.

4. The method of claim 1, wherein the adjacent circular sector is one of (i) a first adjacent circular sector positioned clockwise of the shared circular sector and (ii) a second adjacent circular sector positioned counter-clockwise of the shared circular sector, wherein each of the first adjacent circular sector and the second adjacent circular sector abuts the shared circular sector on a respective side; the method further comprising:
   selecting the adjacent sector from among the first adjacent circular sector and the second adjacent circular sector.

5. The method of claim 4, further comprising:
   determining proximity of the first road segment to the first adjacent circular sector and the second adjacent circular sector;
   determining proximity of the second road segment to the first adjacent circular sector and the second adjacent circular sector; and
   associating the first road segment with the adjacent circular sector in response to determining that the first road segment is more proximate to the adjacent circular sector than the second road segment is to the first adjacent circular sector and to the second adjacent circular sector.

6. The method of claim 5, wherein associating the first road segment with the adjacent circular sector is further in response to determining that the first road segment and the second road segment correspond to off-route turns.

7. The method of claim 4, wherein associating the first road segment with the adjacent circular sector is in response to determining that the first road segment corresponds to an off-route turn and the second road segment corresponds to an on-route turn.

8. The method of claim 7, wherein the second road segment is more proximate to the adjacent circular sector than the first road segment is to the first adjacent circular sector and to the second adjacent circular sector.

9. The method of claim 1, wherein the first road segment and the second road segment correspond to different outgoing lanes relative to a direction of travel.

10. A computer-readable medium storing thereon instructions for generating graphical turn indicators to illustrate maneuvers at road junctions, wherein the instructions, when executed on one or more processors, cause the one or more processors to:
receive turn-by-turn driving directions that specify a route between an origin and a destination, wherein the route includes a plurality of road junctions, each road junction interconnecting several road segments; and
generate graphical turn indicators for the plurality of road junctions, including:
render a respective arrow for each turn type the maneuver includes at a road junction, in accordance with the geometry of the road junction, wherein each turn type is selected from a finite, circularly ordered set of turn types, and
when the maneuver includes two outgoing turns that correspond to a same shared turn type, render, for one of the two outgoing turns, an arrow for a turn type adjacent to the shared turn type in the circularly ordered set.

11. The computer-readable medium of claim 10, wherein the circularly ordered set of turn types includes a plurality of sub-types of a left turn and a plurality of sub-types of a right turn.

12. The computer-readable medium of claim 11, wherein the circularly ordered set of turn types consists of sharp left, left, slight left, straight, slight right, right, sharp right, and u-turn.

13. The computer-readable medium of claim 10, wherein to generate the arrow for the adjacent turn type, the instructions further cause the one or more processors to:
select, from among the two outgoing turns, an outgoing turn based on proximity of each of the two outgoing turns to the turn type disposed clockwise of the shared turn type in the circularly ordered set and the turn type disposed counter-clockwise of the shared turn type in the circularly ordered set.

14. The computer-readable medium of claim 10, wherein the two outgoing turns correspond are off-route turns.

15. The computer-readable medium of claim 10, wherein the two outgoing turns include an on-route turn and an off-route turn, and wherein the outgoing turn for which the arrow for the adjacent turn type is rendered is off-route.

16. A method in a computing device for schematically indicating turn types available for a maneuver at a road junction interconnecting a plurality of road segments, the method comprising:
for each outbound road segment at the road junction, determining a mapping between the outbound road segment and one of a finite, circularly ordered set of turn types, in accordance with the geometry of the road junction;
in response to determining that two outbound road segments at the road junction map to a same turn type, re-mapping a selected one of the two outbound road segments to a different turn type; and
causing different schematic indicators to be generated for those in the set of turn types to which outbound road segments are mapped.

17. The method of claim 16, wherein each in the set of turn types corresponds to a respective circular sector, and wherein the circular sectors corresponding to the set of turn types together form a complete circle.

18. The method of claim 17, wherein:
the circularly ordered set of turn types consists of sharp left, left, slight left, straight, slight right, right, sharp right, and u-turn, and
re-mapping the selected outbound road segment to the different turn type includes changing the turn type to which the selected outbound road segment is mapped to one of predecessor or a successor of the turn type in the set, based on whether the road segment is closer to the clockwise boundary of the circular sector to which it is mapped or the counter-clockwise boundary of the circular sector.

19. The method of claim 16, wherein the selected road segment corresponds to an off-route turn and the other one of the two outbound road segments corresponds to an on-route turn.

20. The method of claim 16 implemented in a network server, wherein causing the different schematic indicators to be generated includes providing data that identifies the different schematic indicators to be transmitted to a client device.

* * * * *